(12) United States Patent
Hassbring et al.

(10) Patent No.: US 12,555,377 B2
(45) Date of Patent: Feb. 17, 2026

(54) DETECTION OF REFLECTION OBJECTS IN A SEQUENCE OF IMAGE FRAMES

(71) Applicant: Axis AB, Lund (SE)

(72) Inventors: Ludvig Hassbring, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 326 days.

(21) Appl. No.: 18/322,789

(22) Filed: May 24, 2023

(65) Prior Publication Data

US 2023/0394824 A1   Dec. 7, 2023

(30) Foreign Application Priority Data

Jun. 7, 2022   (EP) .................................... 22177455

(51) Int. Cl.
| | | |
|---|---|---|
| *G06V 20/40* | (2022.01) | |
| *G06T 7/246* | (2017.01) | |
| *G06T 7/73* | (2017.01) | |
| *G06V 20/52* | (2022.01) | |

(52) U.S. Cl.
CPC .............. *G06V 20/41* (2022.01); *G06T 7/248* (2017.01); *G06T 7/74* (2017.01); *G06V 20/52* (2022.01); *G06T 2207/10016* (2013.01); *G06T 2207/30232* (2013.01)

(58) Field of Classification Search
CPC ........ G06V 20/41; G06V 20/52; G06V 10/60; G06V 40/103; G06V 20/50; G06V 20/46; G06T 7/248; G06T 7/74; G06T 2207/10016; G06T 2207/30232; G06T 7/73; G06T 2207/30204
See application file for complete search history.

(56) References Cited

U.S. PATENT DOCUMENTS

| | | | | |
|---|---|---|---|---|
| 11,747,475 B1* | 9/2023 | Foxlin | ..................... | G01S 17/04 |
| | | | | 356/5.01 |
| 2015/0363654 A1* | 12/2015 | Zhao | ......................... | G06T 7/68 |
| | | | | 382/104 |
| 2016/0019698 A1* | 1/2016 | Kalva | .................... | G06V 20/53 |
| | | | | 382/103 |
| 2020/0175694 A1* | 6/2020 | Kato | ........................ | G06T 7/90 |

(Continued)

OTHER PUBLICATIONS

Extended European Search Report dated Nov. 14, 2022 for European Patent Application No. 22177455.7.

(Continued)

*Primary Examiner* — Oneal R Mistry
*Assistant Examiner* — Jongbong Nah
(74) *Attorney, Agent, or Firm* — Volpe Koenig (57) ABSTRACT

A system and techniques for detecting a reflection of an object in a sequence of image frames. Objects of a given type are detected in the sequence of image frames, and a detection score is determined for each detected object. Distance ratios between unfiltered object position indicators identified for each detected object are determined. A displacement factor is determined for each detected object between a current location of the detected object and a previous location of the detected object. One of the two detected objects which has a lower detection score is a reflection of the other of the two detected objects is determined in response to finding a match between normalized sizes and normalized movements of the detected objects.

16 Claims, 6 Drawing Sheets

(56) References Cited

U.S. PATENT DOCUMENTS

| | | | |
|---|---|---|---|
| 2021/0304435 A1 | 9/2021 | Isberg et al. | |
| 2022/0185625 A1* | 6/2022 | One | B66B 1/3476 |
| 2023/0244892 A1* | 8/2023 | Zou | G06K 7/1443 |
| | | | 382/100 |
| 2023/0350064 A1* | 11/2023 | Hu | G01S 17/18 |
| 2023/0377164 A1* | 11/2023 | Kabkab | G06V 20/647 |

OTHER PUBLICATIONS

Wang et al., "Feature Matching Using Guidance-Constraint Method," IET Computer Vision. (2016).

Fang et al., "Reconstructing 3D Human Pose by Watching Humans in the Mirror," 2021 IEEE/CVF Conference on Computer Vision and Pattern Recognition (CVPR), Nashville, TN, USA, 2021, pp. 12809-12818, (2021).

* cited by examiner

DETECTION OF REFLECTION OBJECTS IN A SEQUENCE OF IMAGE FRAMES

FIELD OF INVENTION

Embodiments presented herein relate to a method, a controller, a computer program, and a computer program product for detecting a reflection of an object in a sequence of image frames.

TECHNICAL BACKGROUND

In general terms, object detection is a computer technology related to computer vision and image processing that deals with detecting instances of semantic objects of a certain class (such as human beings, animals, vehicles, etc.). Some object detection algorithms produce key points, or other types of object position indicators. Such points, or indicators, generally represent points of interest for the target object as tracked from one image frame to the next.

There are some scenarios, or environments, where object detection as referred to above becomes challenging. Taking a city environment as an example, this is a type of environment having a large number of reflective surfaces. The reflective surfaces might be mirrors, but also sheets made of glass, or other types of reflective material. These surfaces generally cause problems for object detection algorithms. In some cases, both a detected object and its reflection will be counted. This could be an issue in applications where the number of detected objects is to be counted, causing some detected objects to be counted twice. For other cases, the reflection might be missed completely. This could be an issue in applications where any detected objects are to be masked, leaving the reflection unmasked.

In US 2020/0175694 A1 is disclosed an information processing device that includes a specification circuit and a count circuit. The specification circuit specifies, based on a similarity of speed depending on a change in positions of a plurality of movable objects in an image, two or more movable objects corresponding to a same real movable object in the movable objects. The count circuit counts the number of real movable objects corresponding to the movable objects based on the specification result of the specification circuit.

However, in practice, a reflection is not perfectly equal to the tracked object it is reflecting. A reflection might appear smaller or larger than the tracked object. Furthermore, reflections made in semitransparent surfaces make the reflection have less details in the image frames than the tracked object. Additionally, the reflection might only include parts of the tracked object. This could cause the specification circuit in the information processing device in US 2020/0175694 A1 to make erroneous decisions as to whether two or more movable objects correspond to the same real movable object in the movable objects.

SUMMARY

An object of embodiments herein is to address the above issues and to provide improved detection of objects in reflective surfaces.

According to a first aspect, there is therefore presented a method for detecting a reflection of an object in a sequence of image frames. The method is performed by a controller. The method comprises detecting objects of a given type in the sequence of image frames, and determining a detection score for each detected object. The method comprises determining, per each detected object, distance ratios between unfiltered object position indicators identified for the detected object. The unfiltered object position indicators are identified in a current image frame in the sequence of image frames. The distance ratios for the detected object define a normalized size of the detected object. The method comprises determining, per each detected object, a displacement factor between a current location of the detected object in the current image frame and a previous location of the detected object in a previous image frame in the sequence of image frames. The displacement factor for the detected object defines a normalized movement for the detected object. The method comprises determining, in response to finding a match between the normalized sizes and the normalized movements of two of the detected objects, that the one of these two detected objects which has a lower detection score is a reflection of the other of these two detected objects.

According to a second aspect, there is presented a controller for detecting a reflection of an object in a sequence of image frames. The controller comprises processing circuitry. The processing circuitry is configured to cause the controller to detect objects of a given type in the sequence of image frames, and determining a detection score for each detected object. The processing circuitry is configured to cause the controller to determine, per each detected object, distance ratios between unfiltered object position indicators identified for the detected object. The unfiltered object position indicators are identified in a current image frame in the sequence of image frames. The distance ratios for the detected object define a normalized size of the detected object. The processing circuitry is configured to cause the controller to determine, per each detected object, a displacement factor between a current location of the detected object in the current image frame and a previous location of the detected object in a previous image frame in the sequence of image frames. The displacement factor for the detected object defines a normalized movement for the detected object. The processing circuitry is configured to cause the controller to determine, in response to finding a match between the normalized sizes and the normalized movements of two of the detected objects, that the one of these two detected objects which has a lower detection score is a reflection of the other of these two detected objects.

According to a third aspect, there is presented a video surveillance system. The video surveillance system comprises a controller according the second aspect and a camera for capturing the sequence of image frames.

According to a fourth aspect, there is presented a computer program for detecting a reflection of an object in a sequence of image frames, the computer program comprising computer program code which, when run on a controller, causes the controller to perform a method according to the first aspect.

According to a fifth aspect, there is presented a computer program product comprising a computer program according to the fourth aspect and a computer readable storage medium on which the computer program is stored. The computer readable storage medium could be a non-transitory computer readable storage medium.

Advantageously, these aspects provide computationally efficient and accurate detection of objects in scenarios, or environments, having reflective surfaces.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF DRAWINGS

The inventive concept is now described, by way of example, with reference to the accompanying drawings, in which.

DETAILED DESCRIPTION

The concepts will now be described more fully hereinafter with reference to the accompanying drawings, in which certain embodiments of the concepts are shown. This concepts may, however, be embodied in many different forms and should not be construed as limited to the embodiments set forth herein; rather, these embodiments are provided by way of example so that this disclosure will be thorough and complete, and will fully convey the scope of the claims to those skilled in the art. Like numbers refer to like elements throughout the description. Any step or feature illustrated by dashed lines should be regarded as optional.

Figure 1:
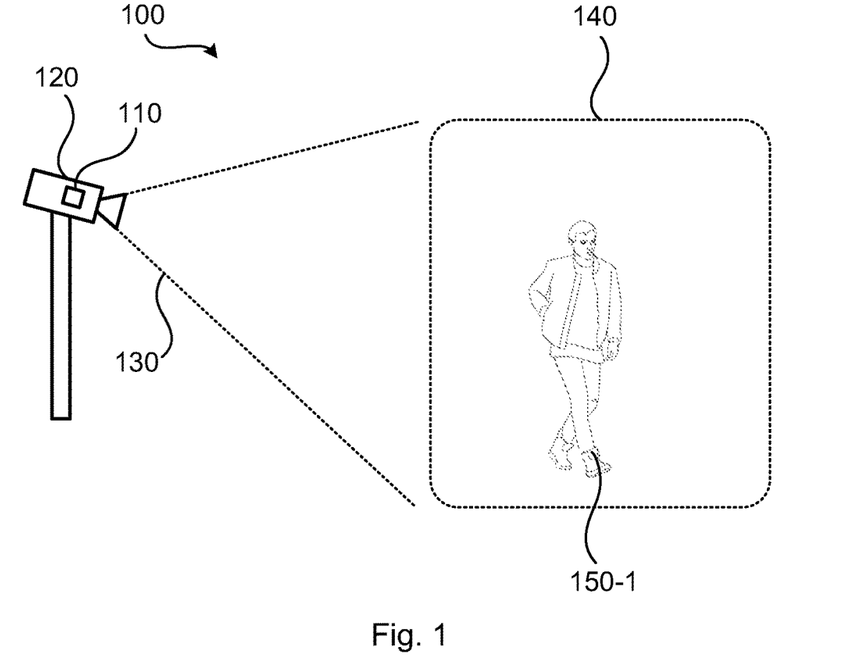
FIG. 1 is a schematic diagram illustrating a video surveillance system according to embodiments.

FIG. 1 is a schematic diagram illustrating a video surveillance system 100 where embodiments presented herein can be applied. A camera 120 is configured to capture image frames, within a Field-of-View (FoV) 130, of a scene 140.

In the illustrative example of FIG. 1 the scene 140 comprises an object 150-1 in the form of a human being. The camera 120 comprises, is collocated with, is integrated with, or at least operatively connected to, a controller 110. It is assumed that the object 150-1 represents a target object that is to be tracked from image frame to image frame, as captured by the camera 120 and as analyzed by the controller 110. For this purpose, the controller 110 might implement an object detection algorithm.

The embodiments disclosed herein relate to techniques for detecting a reflection of an object 150-1 in a sequence of image frames. In order to obtain such techniques there is provided a controller 110, a method performed by the controller 110, a computer program product comprising code, for example in the form of a computer program, that when run on a controller 110, causes the controller 110 to perform the method.

Figure 2:
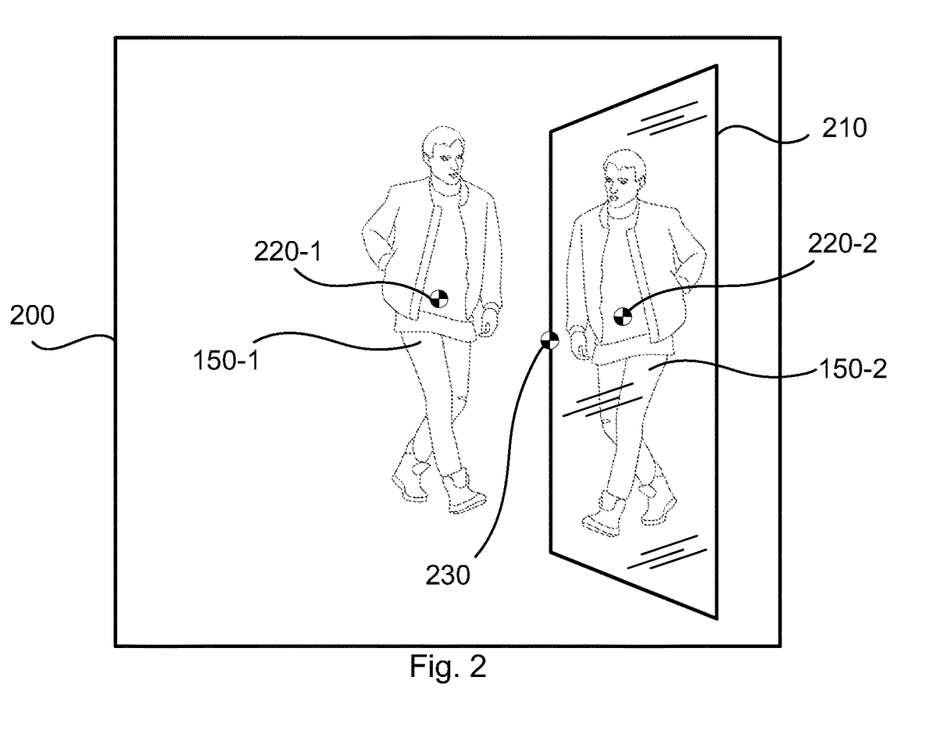
FIG. 2 schematically illustrates an image frame comprising a detected object and a reflection of the detected object according to an embodiment.

FIG. 2 schematically illustrates an image frame 200. The image frame 200 depicts an object 150-1 in the form of a human being, as in the scene 140. The object 150-1 has a location marked at reference numeral 220-1 in the image frame 200. In the image frame 200 is further depicted a reflection surface 210. The reflection surface 210 has a location marked at reference numeral 230 in the image frame 200. The reflection surface 210 causes also a further object 150-2 to be visible. Object 150-2 is a reflection of object 150-1, as caused by object 150-1 being reflected by the reflection surface 210. The object 150-2 has a location marked at reference numeral 220-2 in the image frame 200.

Figure 3:
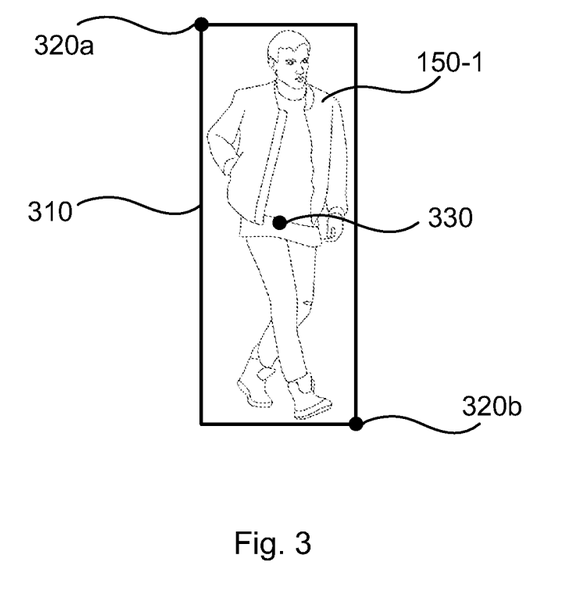
FIG. 3 schematically illustrates a detected object and a bounding box surrounding the detected object according to an embodiment.
Figure 4:
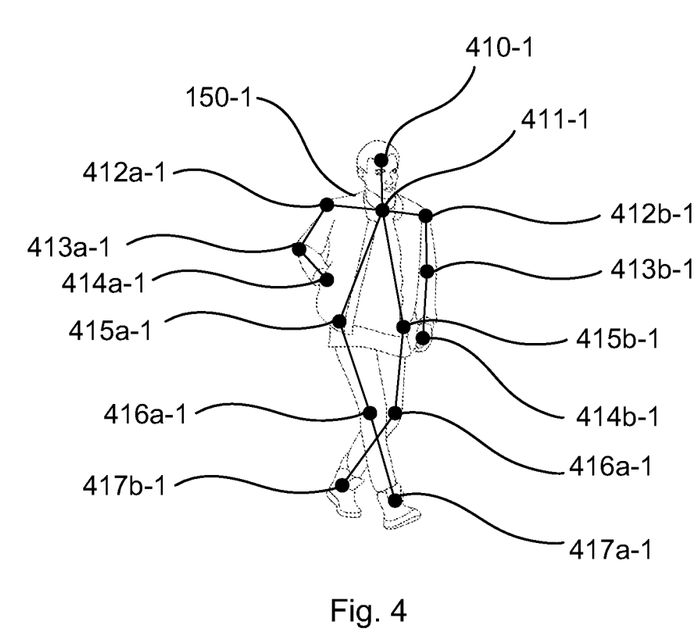
FIG. 4 schematically illustrates a detected object and key points of the detected object according to an embodiment.

The inventors have realized that what object 150-1 and object 150-2 will have in common are their object position indicators. Reference is here made to FIG. 3 and FIG. 4 which schematically illustrate an object 150-1 in the form of a human being, as in the scene 140. In FIG. 3 and FIG. 4 are shown different types of object position indicators. In FIG. 3 the object 150-1 is enclosed by a bounding box 310. The bounding box 310 is defined by two corner points 320a, 320b and one center point 330. The center point 330 could represent the location 220-1 of the object 150-1. The corner points 320a, 320b and the center point 330 could, for instance, be CenterNet keypoints. The bounding box could, for instance, be a CenterNet bounding box. In this respect, the object position indicators might be defined by two or more bounding boxes. That is, two or more bounding boxes might be used to enclose the detected object 150-1. That is, a first bounding box might enclose a first part (such as the head) of the detected object 150-1, a second bounding box might enclose a second part (such as the torso) of the detected object 150-1, and so on. In FIG. 4 the object 150-1 is overlayed by object position indicators 410-1 to 417b-1 as listed in Table 1. These object position indicators could be regarded as a simplified version of COCO key points or MediaPipe Pose key points.

TABLE 1

Correspondence between reference numbers and part of object

| | | | Reference number | | | | | |
|---|---|---|---|---|---|---|---|---|
| | 410-1 | 4111-1 | 412a-1, 412b-1 | 413a-1, 413b-1 | 414a-1, 414b-1 | 415a-1, 415b-1 | 416a-1, 416b-1 | 417a-1, 417b-1 |
| Part of object | Head | Throat | Shoulder (right and left) | Elbow (right and left) | Hand (right and left) | Hip (right and left) | Knee (right and left) | Foot (right and left) |

Figure 5:
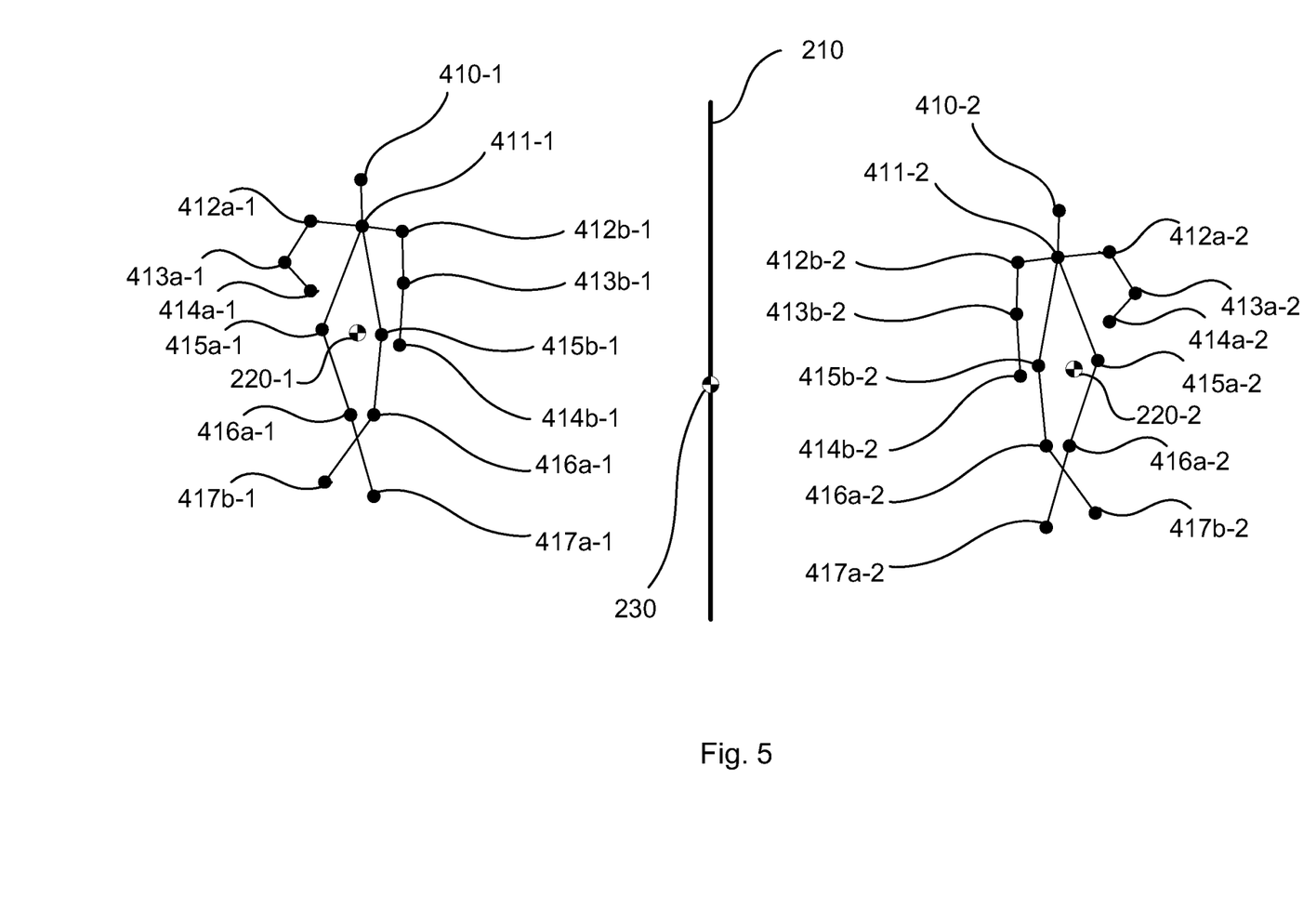
FIG. 5 schematically illustrates key points of a detected object and key points of a reflection of the detected object according to an embodiment.

The object 150-2 being the reflection will have an identical setup of object position indicators but reflected. By analyzing the object position indicators, it is possible to determine object-reflection-pairs, at object level i.e., one tracked object 150-1 and its reflected counterpart object 150-2 or even at object position indicator level. Reference is here made to FIG. 5 which schematically illustrates object position indicators 410-1 to 417b-1 as listed in Table 1 of the object 150-1 (not shown). FIG. 5 also indicates the position 220-1 of the object 150-1. FIG. 5 further illustrates object position indicators 410-2 to 417b-2 of the object 150-2 (not shown) being a reflection of the object 150-1 in the reflection surface 210 at location 230. The object position indicators 410-2 to 417b-2 correspond to the object position indicators listed in Table 1. That is, object position indicator 410-2 represents the head of the object 150-2, and object position indicator 417b-2 represents the left foot of the object 150-2.

Figure 6:
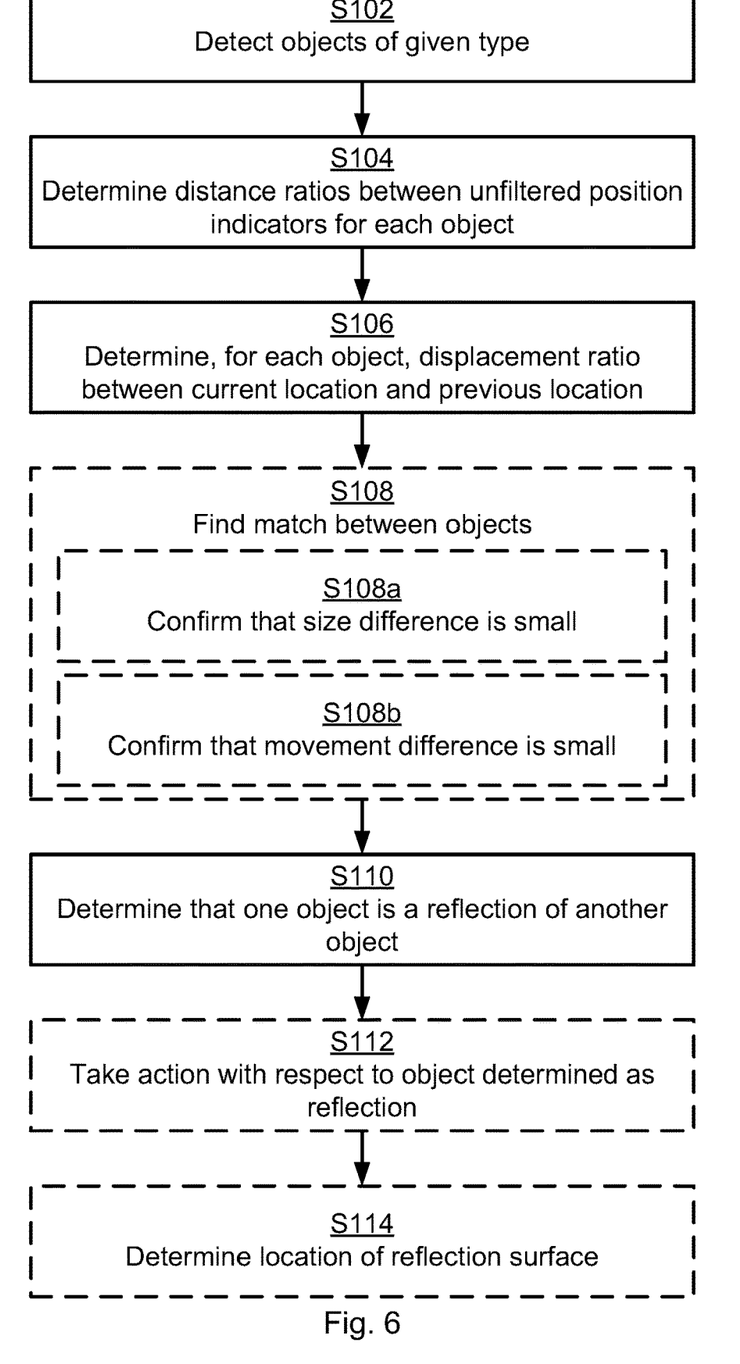
FIG. 6 is a flowchart of methods according to embodiments.

FIG. 6 is a flowchart illustrating embodiments of methods for detecting a reflection of an object 150-1 in a sequence of image frames 200, 800, 900. The methods are performed by the controller 110. The methods are advantageously provided as computer programs 1120.

S102: The controller 110 detects objects 150-1, 150-2 of a given type in the sequence of image frames 200, 800, 900. The controller 110 determines a detection score for each detected object 150-1, 150-2.

In some examples, a detection score is also determined for each object position indicator identified for the detected object 150-1, 150-2 in addition to the detection score that is determined for each detected object 150-1, 150-2 as a whole. The detection scores of the individual object position indicators might only become relevant once the detection score of the detected object 150-1, 150-2 is above some threshold value. Conversely, in some aspects the detection score for a given detected object 150-1, 150-2 is a function of the detection scores for all unfiltered object position indicators identified for the given detected object 150-1, 150-2.

S104: The controller 110 determines, per each detected object 150-1, 150-2, distance ratios between unfiltered object position indicators identified for the detected object 150-1, 150-2. The unfiltered object position indicators are identified in a current image frame 200, 800, 900 in the sequence of image frames 200, 800, 900. The distance ratios for the detected object 150-1, 150-2 define a normalized size of the detected object 150-1, 150-2.

Since the size of the detected object is determined per the detected object as a whole, the size is considered to be the normalized size of the detected object.

S106: The controller 110 determines, per each detected object 150-1, 150-2, a displacement factor between a current location 220-1, 220-2 of the detected object 150-1, 150-2 in the current image frame 200, 800, 900 and a previous location of the detected object 150-1, 150-2 in a previous image frame in the sequence of image frames 200, 800, 900.

The displacement factor for the detected object 150-1, 150-2 defines a normalized movement for the detected object 150-1, 150-2.

Hence, historical data, in terms of a previous image frame in the sequence of image frames 200, 800, 900, is used for the controller 110 to obtain information of the location of the detected object in the previous image frame. Based on how much the detected object has moved from the previous image frame to the current image frame, a measure of the movement of the detected object can be obtained. Since the movement for the detected object is determined per the detected object as a whole, the movement is considered to be the normalized movement for the detected object.

The normalized sizes and the normalized movements of two of the detected objects 150-1, 150-2 can then be compared to each other. That is, the normalized size of one of the two detected objects 150-1, 150-2 is compared to the normalized size of the other of the two detected objects 150-1, 150-2 and the normalized movement of one of the two detected objects 150-1, 150-2 is compared to the normalized movement of the other of the two detected objects 150-1, 150-2. Further in this respect, in general terms, the normalized sizes and the normalized movements imply that certain given measures (the size for the normalized sizes and the movement for the normalized movements) are scaled, or otherwise recalculated, to a common scale. As a non-limiting example, assuming that the object 150-1 and the reflection of the object are seen at mutually different distances to the camera 120, the effect will be that the object 150-1 and the reflection of the object will appear to be of mutually different sizes; the one being located closest to the camera will appear to be larger, and vice versa. By using normalized sizes, the object 150-1 and the reflection of the object will be scaled, or otherwise recalculated, to a common size scale where this effect will be accounted for such that the object 150-1 and the reflection of the object will appear to be of one and the same size. Likewise, under the same assumption, the effect will also be that the object 150-1 and the reflection of the object will appear to move at mutually different speeds; the one being located closest to the camera will appear to move faster, and vice versa. By using normalized movements, the object 150-1 and the reflection of the object will be scaled, or otherwise recalculated, to a common movement scale where this effect will be accounted for such that the object 150-1 and the reflection of the object will appear to move at one and the same speed.

If the normalized sizes and the normalized movements are similar for the two detected objects 150-1, 150-2, then it can be concluded that these two detected objects 150-1, 150-2 have similar size and similar movement. This is an indication that one of the two detected objects 150-1, 150-2 is a reflection of the other of the two detected objects 150-1, 150-2.

S110: The controller 110 determines, in response to finding a match between the normalized sizes and the normalized movements of two of the detected objects 150-1, 150-2, that the one of these two detected objects 150-1, 150-2 which has a lower detection score is a reflection of the other of these two detected objects 150-1, 150-2.

Hence, by considering the detection scores of the two detected objects 150-1, 150-2, the detected object 150-2 with a comparatively low detection score is classified as a reflection of the detected object 150-1 with a comparatively high detection score.

Embodiments relating to further details of detecting a reflection of an object 150-1 in a sequence of image frames 200, 800, 900 as performed by the controller 110 will now be disclosed.

As disclosed above, the controller 110 detects objects 150-1, 150-2 of a given type in the sequence of image frames 200, 800, 900. In this respect, there could be different types of objects 150-1, 150-2 that the controller 110 is configured to detect. In some non-limiting examples, the given type is a human being, an animal, or a vehicle, such as a car or a truck. The controller 110 could therefore have been trained, and thereby configured, to detect objects 150-1, 150-2 of the given type.

As disclosed above, the controller 110 determines, per each detected object 150-1, 150-2, distance ratios between unfiltered object position indicators identified for the detected object 150-1, 150-2. In general terms, the unfiltered object position indicators are object position indicators that have been determined without any objects that have been detected with low detection scores first having been filtered out. That is, unfiltered object position indicators refers to the object position indicators before thresholding is performed to mitigate the false positives in the scene. Since reflections generally have a lower detection score than their non-reflected counterpart, unfiltered object position indicators are used so that the detected object 150-2 being the reflection is not missed. That is, some of the unfiltered object position indicators might belong to objects that would otherwise be filtered out, or discarded, due to producing a low detection score. Hence, in some embodiments, the unfiltered object position indicators are determined for all detected objects 150-1, 150-2 without any of the detected objects 150-1, 150-2 having been filtered out (due to their detection score being lower than a detection threshold).

Further in this respect, there could be different types of object position indicators.

In some non-limiting examples, each of the object position indicators is a Common Objects in Context, COCO, key point 410-1:417b-1, 410-2:417b-2, or a MediaPipe Pose key point. In this respect, the object position indicators need not to be defined by all COCO key points or MediaPipe Pose key points, but rather a subset of these key points could be used as object position indicators. This is illustrated in FIG. 4 as referred to above.

In other non-limiting examples, the object position indicators are corner points 320s, 320b and center points 330 of bounding boxes 310, such as CenterNet bounding boxes. This is illustrated in FIG. 3 as referred to above.

As disclosed below, that one of the two detected objects 150-1, 150-2 is a reflection of the other of the two detected objects 150-1, 150-2 is determined in response to finding a match between the normalized sizes and/or the normalized movements of these two of the detected objects 150-1, 150-2. Therefore, in some embodiments, the controller 110 is configured to perform (optional) step S108.

S108: The controller 110 finds the match between the normalized sizes and/or the normalized movements of two of the detected objects 150-1, 150-2.

There could be different ways for the controller 110 to find the match between the normalized sizes and/or the normalized movements of two of the detected objects 150-1, 150-2. In some aspects, this match-finding is performed by comparing the normalized size and/or the normalized movement of a first detected object 150-1 to the normalized size and/or the normalized movement of a second detected object 150-2. In particular, in some embodiments, the controller 110 is configured to perform (optional) step S108a and/or step S108b as part of step S108.

S108a: The controller 110 confirms that a size difference between the normalized size of one of the two detected objects 150-1, 150-2 and the normalized size of the other of the two detected objects 150-1, 150-2 is smaller than a size threshold.

Hence, the smaller the size difference between the normalized size of one of the two detected objects 150-1, 150-2 and the normalized size of the other of the two detected objects 150-1, 150-2, the higher the chance that there is a match.

S108b: The controller 110 confirms that a movement difference between the normalized movement of one of the two detected objects 150-1, 150-2 and the normalized movement of the other of the two detected objects 150-1, 150-2 is smaller than a movement threshold.

Hence, the smaller the movement difference between the normalized movement of one of the two detected objects 150-1, 150-2 and the normalized movement of the other of the two detected objects 150-1, 150-2, the higher the chance that there is a match.

In some aspects, the matching is performed on an object position indicator level. That is, instead of just comparing the normalized size and/or the normalized movement of a first detected object 150-1 to the normalized size and/or the normalized movement of a second detected object 150-2, a comparison (with respect to size and/or movement) is made between pairs of object position indicators in one of the two detected objects 150-1, 150-2 and pairs of object position indicators in the other of the two detected objects 150-1, 150-2.

That is, assume for illustrative purposes that the two detected objects 150-1, 150-2 represent a human being and the knees of both legs are detectable and are represented by object position indicators in both the two detected objects 150-1, 150-2. Then a first comparison can be made between the normalized distance between the knees according to the object position indicators in one of the two detected objects 150-1, 150-2 and the normalized distance between the knees according to the object position indicators in the other of the two detected objects 150-1, 150-2. Further, a second comparison can be made between the normalized movement of the knees, as given by the object position indicators, in one of the two detected objects 150-1, 150-2 and the normalized movement of the knees, as given by the object position indicators, of the other of the two detected objects 150-1, 150-2. Further such comparisons with respect to size and/or movement can be made for further parts of the detected objects to accumulate a matching score for the two detected objects 150-1, 150-2.

In some aspects, the controller 110 performs some action upon determination that one of the two detected objects 150-1, 150-2 is a reflection of the other of the two detected objects 150-1, 150-2. Hence, in some embodiments, the controller 110 is configured to perform (optional) step S112.

S112: The controller 110 performs an action with respect to the detected object 150-2 being the reflection of the other detected object 150-1.

Figure 7:
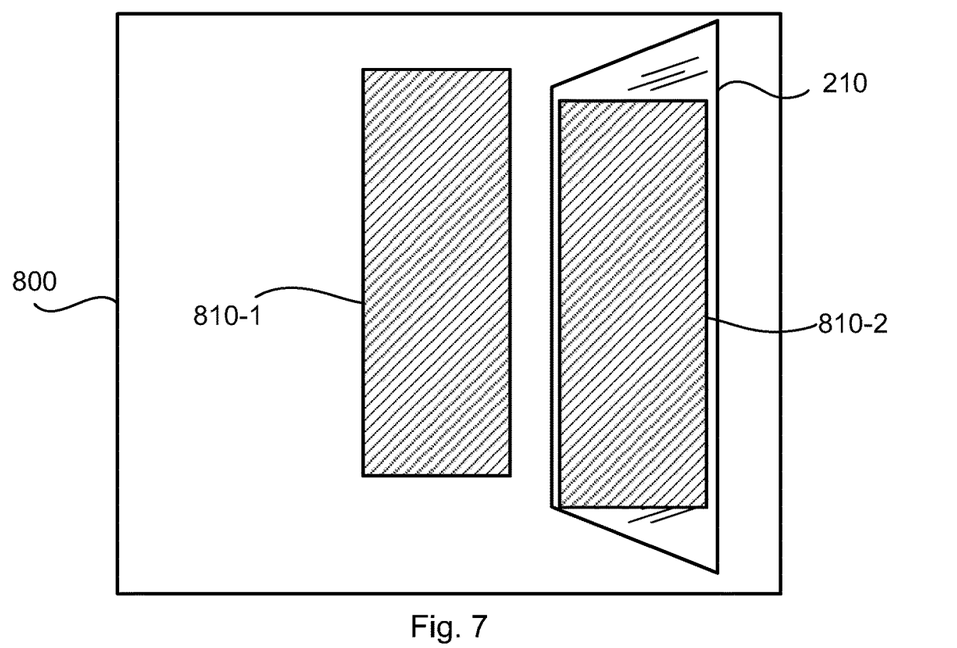
FIG. 7 schematically illustrates an image frame according to an embodiment after a first action having been performed.
Figure 8:
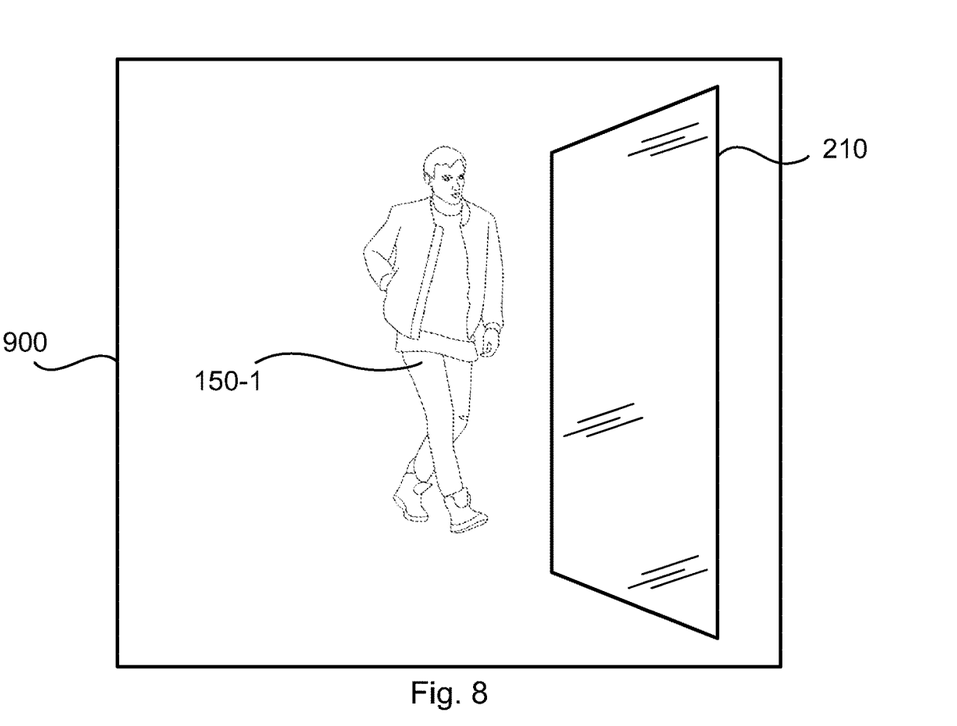
FIG. 8 schematically illustrates an image frame according to an embodiment after a second action having been performed.

There could be different types of actions performed by the controller 110 in step S112. In some non-limiting examples, the action involves applying a mask 810-2 to the detected object 150-2 being the reflection of the other detected object 150-1. Intermediate reference is here made to FIG. 7 which schematically illustrates an image frame 800. The image frame 800 depicts how a first mask 810-1 has been placed where object 150-1 appeared in FIG. 2 and a second mask 810-2 has been placed where object 150-2 appeared in FIG. 2. In some non-limiting examples, the action involves filtering out the detected object 150-2 being the reflection of the other detected object 150-1, lowering the detection score threshold for the detected object 150-2 being the reflection of the other detected object 150-1, etc. Intermediate reference is here made to FIG. 8 which schematically illustrates an image frame 900. The image frame 900 depicts an object 150-1 as in FIG. 2, but where object 150-2 has been filtered out to not appear in image frame 900. In this respect, although object 150-2 representing the reflection is illustrated as being filtered out from the image frame, it is noted that the filtering out generally refers to filtering out the detected object 150-2 from some counting, or other type of calculation, such that object 150-1 is not counted twice.

In some aspects, as shown in FIG. 2, the reflection is caused by a reflection surface 210 being placed between the two detected objects 150-1, 150-2. In general terms, the reflection surface 210 is placed at a midpoint between the locations 220-1, 220-2 of the two detected objects 150-1, 150-2. Therefore, knowledge of the locations 220-1, 220-2 of the two detected objects 150-1, 150-2 is used to determine the location 230 of the reflection surface 210. Hence, in some embodiments, the controller 110 is configured to perform (optional) step S114.

S114: The controller 110 determines a location 230 of a reflection surface 210 causing the one of the detected objects 150-1, 150-2 to be the reflection of the other detected object 150-1, 150-2. The location 230 of the reflection surface 210 is determined as a midpoint between the locations 220-1, 220-2 of the two detected objects 150-1, 150-2.

In some embodiments, knowledge of the location 230 of the reflection surface 210 is utilized for detection of further objects in the sequence of image frames 200, 800, 900. Since the location 230 of the reflection surface 210 can be used as a reference point, or reference line, or even reference surface, knowledge of the location 230 could improve the chance of detecting reflected objects in challenging lighting conditions in future image frames of the same scene, or at least scenes where the reflection surface 210 is still present in the scene.

It is noted that by the matching referring to the normalized sizes of the objects 150-1, 150-2, no consideration needs to be made with respect to that the object position indicators 410-2 to 417b-2 of the object 150-2 are mirrored compared to the object position indicators 410-1 to 417b-1 of the object 150-1. For the same reason, by the matching referring to the normalized movements of the objects 150-1, 150-2, the normalized movement for object 150-1 will be the same as the normalized movements for object 150-2 except for a possible change of sign, due to the placement of the reflection surface 210 with respect to the detected objects 150-1, 150-2. For example, with the placement of the reflection surface 210 as in FIG. 2, if object 150-1 appears to move towards the left in FIG. 2, then object 150-2 appears to move towards the right in FIG. 2. To resolve this potential issue, the normalized movement might be represented by only its magnitude, without considering its direction. Further, for any matching performed on object position indicator level, then the reflection should be taken into considerations when the matching involves any object position indicators for which there is both a right object position indicator and a left object position indicator per each object, such as object position indicators 412a-1, 412b-1, etc.

The thus far disclosed methods and controller 110 might be used as part of techniques for improving detection of human beings and other objects 150-1 in scenes 140 with glass surfaces. Glass surfaces may be both reflective and transmissive. A reflected image may be dimmer than the image of the actual person or object. The same is true for a human being, or other object 150-1, visible through the glass, particularly under some light conditions. As already disclosed, if the purpose of detecting the object 150-1 is to mask the object 150-1, then there is a risk that a mirror image of an object 150-1 remains unmasked and possibly identifiable if thresholds for detection are too strict. Conversely, if the purpose of detecting the object 150-1 is for counting, then there is a risk of double counting the object 150-1 if thresholds for detection are too generous.

Therefore, in some aspects, areas are identified where reflected images and transmissive images are likely to occur. It may be easier to identify such areas under certain lighting conditions and knowledge gained during beneficial conditions may be used during more difficult conditions. If a surface can be identified where reflections 150-2 of objects 150-1 often are found, but equally often reflections are not found (e.g., the keypoints do not have a match), it is likely that this surface is both reflective and transmissive.

Lighting conditions might impact how reflected and/or transmitted an object 150-1, 150-2 will be. For example, it is generally comparatively easier to study surfaces with high reflection or transmission, as this makes the detection more distinct, and therefore more reliable. On the other hand, it is generally difficult to detect objects under dim lighting conditions. Information of the lighting conditions might therefore be used when determining whether an object is a reflection or not. For example, thresholds may be lowered when dim lighting conditions are indicated. This may also help in tuning the keypoint reflection algorithm. For example, if it is found that in a given area of the image it is more likely to find reflections rather than transmissions, then a more aggressive search for keypoint pairs can be performed in this given area of the image. Further, bright lighting conditions generally create more reflected objects than transmissive objects. This knowledge may also be used for aiding the algorithm. Thus, if the lighting conditions indicate a high likelihood of reflections, then a more aggressive search for keypoint pairs may be performed.

A possible approach will now be briefly described. Reflections can be found using the methods as described above. The number of recorded reflections in a given part of the scene 140 is saved over time. This could be regarded as generating a heatmap. If there are many recorded reflections, but also a lot of true targets for a given surface, this is marked in the heatmap. For a privacy masking application, a static mask may be applied on this surface to ensure that reflections are masked, even in case they fall below a current detection threshold. Alternatively, the masking threshold required to mask an object 150-2 may be lowered in this area. For each image frame 200, it may be possible to determine if a detected object 150-1, 150-2 is a reflection or not by finding reflection pairs in the scene 140. Thus, by building data over time using the probability of an object 150-1 being a reflection or not, it may be possible to in the future predict the probability of a new object located in the same area of the image frame being a reflection or not.

Figure 9:
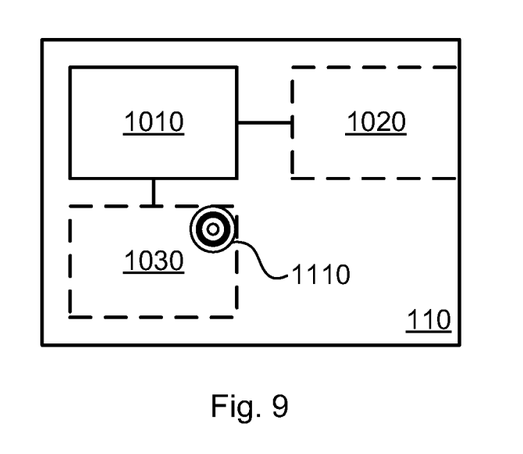
FIG. 9 is a schematic diagram showing functional units of a controller according to an embodiment.

FIG. 9 schematically illustrates, in terms of a number of functional units, the components of a controller 110 according to an embodiment. Processing circuitry 1010 is provided using any combination of one or more of a suitable central processing unit (CPU), multiprocessor, microcontroller, digital signal processor (DSP), etc., capable of executing software instructions stored in a computer program product 1110 (as in FIG. 10), e.g. in the form of a storage medium 1030. The processing circuitry 1010 may further be provided as at least one application specific integrated circuit (ASIC), or field programmable gate array (FPGA).

Particularly, the processing circuitry 1010 is configured to cause the controller 110 to perform a set of operations, or steps, as disclosed above. For example, the storage medium 1030 may store the set of operations, and the processing circuitry 1010 may be configured to retrieve the set of operations from the storage medium 1030 to cause the controller 110 to perform the set of operations. The set of operations may be provided as a set of executable instructions.

Thus, the processing circuitry 1010 is thereby arranged to execute methods as herein disclosed. The storage medium 1030 may also comprise persistent storage, which, for example, can be any single one or combination of magnetic memory, optical memory, solid state memory or even remotely mounted memory. The controller 110 may further comprise a communications interface 1020 at least configured for communications with the camera 120, potentially with other functions, nodes, entities and/or devices, such as functions, nodes, entities and/or devices of a video surveillance system. As such the communications interface 1020 may comprise one or more transmitters and receivers, comprising analogue and digital components. The processing circuitry 1010 controls the general operation of the controller 110, e.g., by sending data and control signals to the communications interface 1020 and the storage medium 1030, by receiving data and reports from the communications interface 1020, and by retrieving data and instructions from the storage medium 1030. Other components, as well as the related functionality, of the controller 110 are omitted in order not to obscure the concepts presented herein.

The controller 110 may be provided as a standalone device or as a part of at least one further device. For example, the controller 110 and the camera 120 might be part of a video surveillance system 100. Optionally, the controller 110 may be integrated in the camera 120. A first portion of the instructions performed by the controller 110 may be executed in a first device, and a second portion of the of the instructions performed by the controller 110 may be executed in a second device; the herein disclosed embodiments are not limited to any particular number of devices on which the instructions performed by the controller 110 may be executed. Hence, the methods according to the herein disclosed embodiments are suitable to be performed by a controller 110 residing in a cloud computational environment. Therefore, although a single processing circuitry 1010 is illustrated in FIG. 9 the processing circuitry 1010 may be distributed among a plurality of devices, or nodes. The same applies to the computer program 1120 of FIG. 10.

Figure 10:
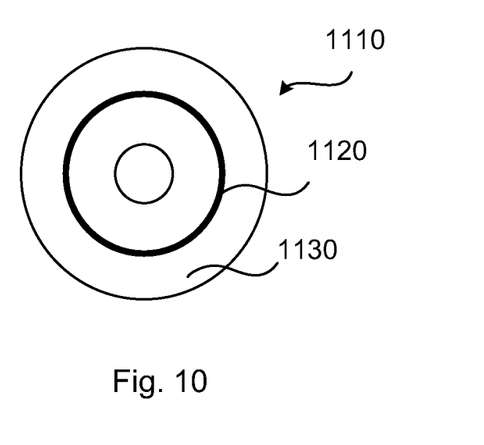
FIG. 10 shows one example of a computer program product comprising computer readable storage medium according to an embodiment.

FIG. 10 shows one example of a computer program product 1110 comprising computer readable storage medium 1130. On this computer readable storage medium 1130, a computer program 1120 can be stored, which computer program 1120 can cause the processing circuitry 1010 and thereto operatively coupled entities and devices, such as the communications interface 1020 and the storage medium 1030, to execute methods according to embodiments described herein. The computer program 1120 and/or computer program product 1110 may thus provide means for performing any steps as herein disclosed.

In the example of FIG. 10, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for detecting a reflection of an object in a sequence of image frames, the method being performed by a controller, the method comprising:
    detecting objects of a given type in the sequence of image frames, and determining a detection score for each detected object;
    determining per each detected object, distance ratios between unfiltered object position indicators identified for the detected object, the unfiltered object position indicators being defined by object position indicators before subjected to thresholding, the unfiltered object position indicators being identified in a current image frame in the sequence of image frames, the distance ratios for the detected object defining a normalized size of the detected object;
    determining, per each detected object, a displacement factor between a current location of the detected object in the current image frame and a previous location of the detected object in a previous image frame in the sequence of image frames, the displacement factor for the detected object defining a normalized movement for the detected object; and
    determining, in response to finding a match between the normalized sizes and the normalized movements of two of the detected objects, that the one of these two detected objects which has a lower detection score is a reflection of the other of these two detected objects.

2. The method according to claim 1, wherein the unfiltered object position indicators are determined for all detected objects without any of the detected objects, due to their detection score being lower than a detection threshold, having been filtered out.

3. The method according to claim 1, wherein the method further comprises:
    finding the match between the normalized sizes and the normalized movements of two of the detected objects.

4. The method according to claim 3, wherein finding the match comprises:

confirming that a size difference between the normalized size of one of the two detected objects and the normalized size of the other of the two detected objects is smaller than a size threshold; and confirming that a movement difference between the normalized movement of one of the two detected objects and the normalized movement of the other of the two detected objects is smaller than a movement threshold.

5. The method according to claim 1, wherein the method further comprises:

performing an action with respect to the detected object being the reflection of the other detected object.

6. The method according to claim 5, wherein the action involves any of: applying a mask to the detected object being the reflection of the other detected object, filtering out the detected object being the reflection of the other detected object.

7. The method according to claim 1, wherein the method further comprises:

determining a location of a reflection surface causing the one of the detected objects to be the reflection of the other detected object as a midpoint between the locations of the two detected objects.

8. The method according to claim 7, wherein knowledge of the location of the reflection surface is utilized for detection of further objects in the sequence of image frames.

9. The method according to claim 1, wherein each of the object position indicators is a Common Objects in Context, (COCO), key point, or a MediaPipe Pose key point.

10. The method according to claim 1, wherein the object position indicators are corner points and center points of bounding boxes, such as CenterNet bounding boxes.

11. The method according to claim 1, wherein the given type is a human being, an animal, or a vehicle, such as a car or a truck.

12. The method according to claim 1, wherein the normalized movements comprises scaling or recalculating one or more measures to a common scale.

13. The method according to claim 1, wherein the lower detection score provides that unfiltered object position indicators being reflected are not missed, filtered out, or discarded.

14. A controller for detecting a reflection of an object in a sequence of image frames, the controller comprising processing circuitry, the processing circuitry being configured to cause the controller to:

detect objects of a given type in the sequence of image frames, and determining a detection score for each detected object;

determine, per each detected object, distance ratios between unfiltered object position indicators identified for the detected object, the unfiltered object position indicators being identified in a current image frame in the sequence of image frames, the distance ratios for the detected object defining a normalized size of the detected object;

determine, per each detected object, a displacement factor between a current location of the detected object in the current image frame and a previous location of the detected object in a previous image frame in the sequence of image frames, the displacement factor for the detected object defining a normalized movement for the detected object; and determine, in response to finding a match between the normalized sizes and the normalized movements of two of the detected objects, that the one of these two detected objects which has a lower detection score is a reflection of the other of these two detected objects.

15. A video surveillance system, the video surveillance system comprising a camera for capturing a sequence of image frames, and a controller for detecting a reflection of an object in the sequence of image frames, the controller comprising processing circuitry, the processing circuitry being configured to cause the controller to:

detect objects of a given type in the sequence of image frames, and determining a detection score for each detected object;

determine, per each detected object, distance ratios between unfiltered object position indicators identified for the detected object, the unfiltered object position indicators being identified in a current image frame in the sequence of image frames, the distance ratios for the detected object defining a normalized size of the detected object;

determine, per each detected object, a displacement factor between a current location of the detected object in the current image frame and a previous location of the detected object in a previous image frame in the sequence of image frames, the displacement factor for the detected object defining a normalized movement for the detected object; and determine, in response to finding a match between the normalized sizes and the normalized movements of two of the detected objects, that the one of these two detected objects which has a lower detection score is a reflection of the other of these two detected objects.

16. A non-transitory computer readable storage medium having stored thereon a computer program for detecting a reflection of an object in a sequence of image frames, the computer program comprising computer code which, when run on processing circuitry of a controller, causes the controller to:

detect objects of a given type in the sequence of image frames, and determining a detection score for each detected object;

determine, per each detected object, distance ratios between unfiltered object position indicators identified for the detected object, the unfiltered object position indicators being identified in a current image frame in the sequence of image frames, the distance ratios for the detected object defining a normalized size of the detected object;

determine, per each detected object, a displacement factor between a current location of the detected object in the current image frame and a previous location of the detected object in a previous image frame in the sequence of image frames, the displacement factor for the detected object defining a normalized movement for the detected object; and determine, in response to finding a match between the normalized sizes and the normalized movements of two of the detected objects, that the one of these two detected objects which has a lower detection score is a reflection of the other of these two detected objects.

* * * * *